United States Patent [19]

Ohtani et al.

[11] Patent Number: 5,578,249

[45] Date of Patent: Nov. 26, 1996

[54] PROCESS FOR PRODUCING ELECTRICALLY CONDUCTIVE ORGANIC POLYMER COMPOSITION

[75] Inventors: Akira Ohtani; Yoshihiro Uetani; Masao Abe; Yasuhito Funada; Keisuke Kii, all of Osaka, Japan

[73] Assignee: Nitto Denko Corporation, Osaka, Japan

[21] Appl. No.: 442,225

[22] Filed: May 16, 1995

Related U.S. Application Data

[63] Continuation of Ser. No. 77,459, Jun. 17, 1993.

[30] Foreign Application Priority Data

Jun. 30, 1992 [JP] Japan ................................. 4-173406
Feb. 25, 1993 [JP] Japan ................................. 5-037085

[51] Int. Cl.$^6$ ................................. H01B 1/12; B05B 5/12
[52] U.S. Cl. ................................. 252/519; 252/500; 252/518; 427/58; 427/385.5
[58] Field of Search ................................. 252/500, 518, 252/519; 427/58, 385.5; 525/540; 528/422, 488, 489, 480, 487, 491, 492

[56] References Cited

U.S. PATENT DOCUMENTS

| | | | |
|---|---|---|---|
| 4,615,829 | 10/1986 | Tamura et al. | 252/500 |
| 4,803,096 | 2/1989 | Kuhn et al. | 252/500 |
| 4,963,206 | 10/1990 | Shacklette et al. | 427/163 |
| 4,975,317 | 12/1990 | Kuhn et al. | 427/58 |
| 5,006,278 | 4/1991 | Elsenbaumer | 427/385.5 |
| 5,008,041 | 4/1991 | Cameron et al. | 252/500 |
| 5,079,096 | 1/1992 | Miyake et al. | 252/500 |
| 5,198,153 | 3/1993 | Angelopoulos et al. | 252/500 |
| 5,205,965 | 4/1993 | Uetani et al. | 252/500 |
| 5,281,363 | 1/1994 | Shacklette | 252/500 |
| 5,324,815 | 6/1994 | Ohtani et al. | 252/500 |
| 5,378,403 | 1/1995 | Shacklette | 252/500 |
| 5,489,400 | 2/1996 | Liu et al. | 252/500 |

FOREIGN PATENT DOCUMENTS

| | | |
|---|---|---|
| 0362378 | 4/1990 | European Pat. Off. |
| 0361429 | 4/1990 | European Pat. Off. |
| 0497379 | 8/1992 | European Pat. Off. |
| 0546553 | 6/1993 | European Pat. Off. |
| 4-139257 | 5/1992 | Japan ................................. 252/500 |
| 92/18987 | 11/1992 | WIPO ................................. 252/500 |

OTHER PUBLICATIONS

Dean, John A., *Lange's Handbook of Chemistry*, McGraw-Hill, Inc., 14th ed., 1992, pp. 8.14 and 8.63.
*1986-87 Alfa Catalog*, Morton Thiokol, Inc., 1986, p. 322.
*Dictionary of Organic Compounds*, Chapman and Hall, 5th ed., 1982, v. 5, p. 4633.
Kirk-Othmer, *Encyclopedia of Chemical Technology*, John Wiley & Sons, 3rd ed., 1980, v. 12, pp. 739 and 740.
Brignell, P. J., et al., "Acidity Functions and the Protonation of Weak Bases", *J. Chem. Soc.(B)*, 1967, 1233–5.

*Primary Examiner*—Douglas J. McGinty
*Attorney, Agent, or Firm*—Sughrue, Mion, Zinn, Macpeak & Seas

[57] ABSTRACT

An organic polymer solution composition and a process for producing an electrically conductive organic polymer using the composition are disclosed. The composition comprising in organic polymer having an imino-p-phenylene structural unit represented by formula (I):

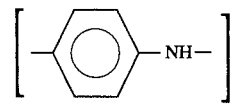

as the main repeating unit, a protonic acid salt, and an organic solvent, the polymer and the salt being dissolved in the organic solvent.

7 Claims, No Drawings

PROCESS FOR PRODUCING ELECTRICALLY CONDUCTIVE ORGANIC POLYMER COMPOSITION

This is a Continuation of Application Ser. No. 08/077,459 filed Jun. 17, 1993.

FIELD OF THE INVENTION

The present invention relates to an organic polymer solution composition. More particularly, this invention relates to a solution composition containing an organic solvent-soluble, high-molecular weight polyaniline which gives an electrically conductive polyaniline upon doping with a protonic acid, and a protonic acid salt. The invention further relates to a process for producing an electrically conductive organic polymer from the solution composition.

BACKGROUND OF THE INVENTION

In general, an electrically conductive organic polymer called polyaniline is a polymer having a quinonediimine structural unit represented by the formula

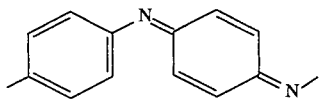

as the main repeating unit (U.S. Pat. No. 4,615,829). Specifically, this polymer is a quinonediimine-phenylenediamine type polyaniline which has a quinonediimine structural unit and a phenylenediamine structural unit both represented by formula (II):

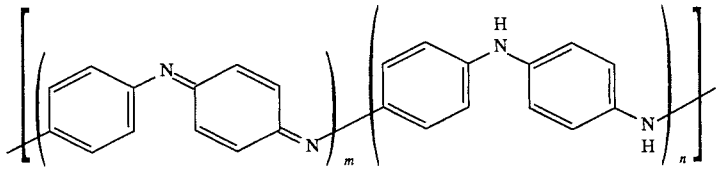

as the main repeating units and which is doped with a protonic acid. It is generally said that protonation of nitrogen atoms in the quinonediimine structural units of such a polyaniline is indispensable to development of electrical conductivity. In the above formula, m and n indicate molar fractions of the quinonediimine structural unit and the phenylenediamine structural unit, respectively, in the repeating units, provided that $0<m<1$, $0<n<1$, and $m+n=1$.

A film of such an electrically conductive polyaniline can be obtained by dissolving a solvent-soluble quinonediimine-phenylenediamine type polyaniline in a proper solvent, casting the solution followed by drying to form a film, and then subjecting the film to a doping treatment (protonic acid doping) by immersing the film in an aqueous solution of a protonic acid, as described in, e.g., JP-A-3-28229. (The term "JP-A" as used herein means an "unexamined published Japanese patent application".)

However, long time has usually been required to dope with a protonic acid after the preparation of a solvent-soluble quinonediimine-phenylenediamine type polyaniline film as described above. Illustratively stated, although doping time varies considerably depending on the kind of the protonic acid used and the properties of the polyaniline film, such as film thickness, porosity, etc., the doping of a polyaniline film having a thickness of about 20 μm, for example, necessitates several-hour immersion in an aqueous hydrochloric acid solution in order to impart an electrical conductivity of 1 S/cm or higher. When p-toluenesulfonic acid is used as the acid, several days may be required. In the case of using an acid having a high molecular weight such as 1,5-naphthalenedisulfonic acid, more prolonged time may be required.

In another method, p-toluenesulfonic acid is dissolved in a solution of a quinonediimine-phenylenediamine type polyaniline of the above described kind to prepare a doped-state polyaniline solution, and this solution is cast and dried to thereby obtain an electrically conductive film. This method, however, is disadvantageous in that only a limited number of protonic acids can be used to obtain a quinonediimine-phenylenediamine type polyaniline which is in the doped state and is solvent-soluble, and that a polyaniline generally has a far lower solubility in the doped state than in the undoped state and, in particular, the solubility is significantly decreased by a polyvalent acid such as 1,5-naphthalenedisulfonic acid. Instability of the solution is also disadvantageous in industrially utilizing the solution.

JP-A-3-52929 discloses a process for producing an electrically conductive polyaniline film which comprises dissolving in a solvent an imino-p-phenylene type polyaniline having an imino-p-phenylene structural unit represented by formula (I):

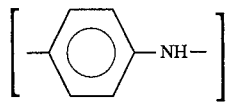

as the main repeating unit, adding a proper oxidizing agent to the resulting solution, and then casting the mixture to form the film. According to this process, the imino-p-phenylene type polyaniline is converted by oxidation into a quinonediimine-phenylenediamine type polyaniline. In this case also, the polyaniline is doped with anions of the oxidizing agent. Since this doping is accompanied by an oxidation reaction, it is usually called oxidation doping.

However, such a polyaniline solution also has a problem concerning solution stability because the polyaniline has been converted to a quinonediimine-phenylenediamine type polyaniline in the doped state.

For improving the solution stability, a method has been proposed which comprises adding a reducing agent such as phenylhydrazine to a solution of a quinonediimine-phenylenediamine type polyaniline to convert the polyaniline to the imino-p-phenylene type thereby improving the solubility, and then adding a dopant to the solution. However, since the imino-p-phenylene type polyaniline solution containing a dopant gives a film in which the polyaniline is based on the imino-p-phenylene structure and hence contains the above-described quinonediimine structure in a small proportion, it is necessary that, for development of electrical conductivity, the imino-p-phenylene structure be oxidized into the quinonediimine structure. This oxidation reaction may require about one week when, for example, the film has a thickness of about 20 μm and the oxygen in air is used for the oxidation. The necessity of such a long time for the development of electrical conductivity is exceedingly disadvantageous industrially.

As a method for overcoming the above problem, a method of obtaining an electrically conductive thin film is proposed in JP-A-3-285983 which method comprises dissolving an ammonium salt of a protonic acid in a quinonediimine-phenylenediamine type polyaniline solution, applying this solution on a suitable substrate, and then drying the coating to thereby evaporate and remove the highly volatile ammonia or organic amine while remaining the less volatile protonic acid in the thin polyaniline film to make the polyaniline in the doped state.

As a result of further investigations by the present inventors on the above method for the practical application of the method, it was found that the organic amine does not always evaporate readily during drying when the film thickness is 1 μm or more, particularly 10 μm or more, and hence that there are cases that it is difficult to obtain sufficient electrical conductivity.

On the other hand, JP-A-60-133027 and Faraday Discuss. Chem. Soc., 88, 317 (1989) disclose that a quinonediimine-phenylenediamine type polyaniline can be obtained by subjecting a powder of an imino-p-phenylene type polyaniline to an oxidation doping treatment with an acetonitrile solution of ferric chloride or with hydrogen peroxide and a solution of an inorganic acid such as hydrochloric acid, sulfuric acid, or phosphoric acid.

The present inventors also have found that the oxidation doping of an imino-p-phenylene type polyaniline film with a thickness of, e.g., about 20 μm using p-quinone or hydrogen peroxide as the oxidizing agent and using any of various organic acids as the protonic acid proceeds far more speedily than the above-described protonic acid doping treatment.

Although such oxidation doping is more practical than the protonic acid doping treatment, it still requires much time if a protonic acid having a relatively large molecular size such as 1,5-naphthalenedisulfonic acid is used as the dopant. For example, in the case of using a water/ethanol mixed solvent containing both p-quinone and 1,5-naphthalenedisulfonic acid, the attainable electrical conductivity is as low as $10^{-1}$ S/cm or less even when the treatment is conducted for 60 minutes.

SUMMARY OF THE INVENTION

Intensive studies have been made to overcome the above-described problems associated with the production of an electrically conductive polyaniline containing a protonic acid as dopant. As a result, it has been found that when doping is conducted by a method in which a protonic acid salt is dissolved in a solution of an imino-p-phenylene type polyaniline and the resulting solution is applied on a proper substrate and dried to obtain a film which is then treated with a solution of both a protonic acid and an oxidizing agent to oxidize and dope the polyaniline, the doping can be conducted extremely speedily and it is possible to obtain a polyaniline solution composition having excellent solution stability and to obtain an electrically conductive polyaniline film showing excellent stabililty in electrical conductivity. The present invention has been completed based on this finding.

Accordingly, one object of the present invention is provide an organic polymer solution composition which comprises an organic polymer having an imino-p-phenylene structural unit represented by formula (I):

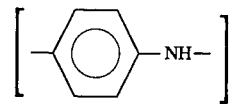

as the main repeating unit, a protonic acid salt, and an organic solvent, the polymer and the salt being dissolved in the organic solvent.

Another object of the present invention is to provide a process for producing an electrically conductive organic polymer which comprises applying the above-described organic polymer solution composition on a substrate, drying the applied composition, and then subjecting the dry polymer to oxidation and doping treatment with a solution containing dissolved or dispersed therein both a protonic acid and an oxidizing agent.

DETAILED DESCRIPTION OF THE INVENTION

The polyaniline used in the present invention is an organic polymer which has an imino-p-phenylene structural unit as the main repeating unit, represented by formula (I) described above and is soluble in an organic solvent in the undoped state. It is preferred in the present invention that the imino-p-phenylene type polyaniline have an intrinsic viscosity [η] as measured in N-methyl-2-pyrrolidone at 30° C. of 0.40 dl/g or higher, from the standpoint of the strength and other properties of the electrically conductive polyaniline film obtained.

Such a polyaniline can be obtained by reducing with a reducing agent an organic polymer having a quinonediimine structural unit and a phenylenediamine structural unit both represented by formula (II):

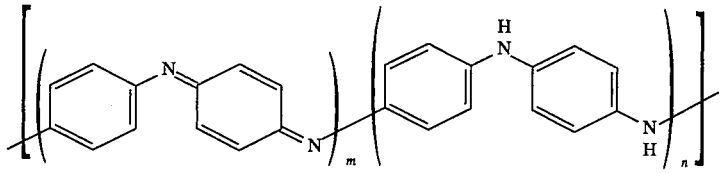

wherein m and n each represents a molar fraction of the quinonediimine structural unit and the phenylenediamine structural unit, respectively, in the repeating units, provided that $0<m<1$, $0<n<1$, and $m+n=1$, as the main repeating units, and which is soluble in an organic solvent in the undoped state, as described in detail in JP-A-3-52929.

Preferred examples of the reducing agent include hydrazine compounds such as phenylhydrazine, hydrazine, hydrazine hydrate, hydrazine sulfate, and hydrazine hydrochloride and reducing metal hydride compounds such as lithium aluminum hydride and lithium borohydride. Of those, hydrazine hydrate or phenylhydrazine is particularly preferably used as the reducing agent since they do not leave a residue after the reduction reaction.

The organic polymer solution composition according to the present invention is obtained by dissolving the thus-obtained imino-p-phenylene type polyaniline in an organic solvent along with a protonic acid salt.

The protonic acid salt used in the present invention preferably is a salt of an organic acid having an acid dissociation constant, $pK_a$ value, of 4.8 or less. Salts of such organic acids include salts of mono- or polybasic acids of the aliphatic, aromatic, aroaliphatic, alicyclic type or the like. Such organic acids may have a hydroxyl group, a halogen atom, a nitro group, a cyano group, an amino group, etc. Examples of such organic acids include acetic acid, n-butyric acid, pentadecafluorooctanoic acid, pentafluoroacetic acid, trifluoroacetic acid, trichloroacetic acid, dichloroacetic acid, monofluoroacetic acid, monobromoacetic acid, monochloroacetic acid, cyanoacetic acid, acetylacetic acid, nitroacetic acid, triphenylacetic acid, formic acid, oxalic acid, benzoic acid, m-bromobenzoic acid, p-chlorobenzoic acid, m-chlorobenzoic acid, p-chlorobenzoic acid, o-nitrobenzoic acid, 2,4-dinitrobenzoic acid, 3,5-dinitrobenzoic acid, picric acid, o-chlorobenzoic acid, p-nitrobenzoic acid, m-nitrobenzoic acid, trimethylbenzoic acid, p-cyanobenzoic acid, m-cyanobenzoic acid, Thymol Blue, salicylic acid, 5-aminosalicylic acid, o-methoxybenzoic acid, 1,6-dinitro-4-chlorophenol, 2,6-dinitrophenol, 2,4-dinitrophenol, poxybenzoic acid, bromophenol blue, mandelic acid, phthalic acid, isophthalic acid, maleic acid, fumaric acid, malonic acid, tartaric acid, citric acid, lactic acid, succinic acid, α-alanine, β-alanine, glycine, glycolic acid, thioglycolic acid, ethylenediamine-N,N'-diacetic acid, and ethylenediamine-N,N,N',N'-tetraacetic acid.

The organic acid may have a sulfonic acid group or a sulfuric acid group. Examples of such an organic acid include aminonaphtholsulfonic acid, metanilic acid, sulfanilic acid, allylsulfonic acid, laurylsulfuric acid, xylenesulfonic acid, chlorobenzenesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, benzenesulfonic acid, styrenesulfonic acid, p-toluenesulfonic acid, naphthalenesulfonic acid, alkylnaphthalenesulfonic acids, and dodecylbenzenesulfonic acid.

Protonic acid salts which are preferably used in the present invention are salts of polyfunctional organic sulfonic acids having 2 or more sulfonic acid groups in the molecule. Examples of such polyfunctional organic sulfonic acids include ethanedisulfonic acid, propanedisulfonic acid, butanedisulfonic acid, pentanedisulfonic acid, hexanedisulfonic acid, heptanedisulfonic acid, octanedisulfonic acid, nonanedisulfonic acid, decanedisulfonic acid, benzenedisulfonic acid, naphthalenedisulfonic acid, naphthalenetrisulfonic acid, naphthalenetetrasulfonic acid, anthracenedisulfonic acid, anthraquinonedisulfonic acid, phenanthrenedisulfonic acid, fluorenonedisulfonic acid, carbazoledisulfonic acid, diphenylmethanedisulfonic acid, biphenyldisulfonic acid, terphenyldisulfonic acid, terphenyltrisulfonic acid, naphthalenesulfonic acid-formalin condensates, phenanthrenesulfonic acid-formalin condensates, anthracenesulfonic acid-formalin condensates, fluorenesulfonic acid-formalin condensates, and carbazolesulfonic acid-formalin condensates. The position of each sulfonic acid group in the aromatic ring is optional.

The organic acid salt used in the present invention may be a salt of a polymer acid. Examples of the polymer acid include polyvinylsulfonic acid, polyvinylsulfuric acid, polystyrenesulfonic acid, sulfonated styrene-butadiene copolymers, polyallylsulfonic acid, polymethallylsulfonic acid, poly-2-acrylamido-2-methylpropanesulfonic acid, halogenated polyacrylic acid, polyisoprenesulfonic acid, N-sulfoalkylpolyanilines, and ring-sulfonated polyanilines. The fluoropolymers known as Nafion (registered trademark of E.I. du Pont de Nemours & Co., Inc.) are also suitably used as the polymer acid.

Use of a polyvalent aromatic sulfonic acid salt such as a 1,5-naphthalenedisulfonic acid salt, or a polymer acid salt is especially preferred in the present invention because these salts give an electrically conductive polyaniline having excellent heat resistance, water resistance, and other properties.

The counter ion for constituting the protonic acid salt used in the present invention may be an ion of an alkali metal, e.g., sodium or potassium, ammonium ion, or a cation derived from an organic amine (this cation and a salt thereof are often referred to as an organic ammonium and an organic amine salt, respectively). That is, the protonic acid salt used in the present invention is an ammonium salt, organic amine salt, or metal salt.

Examples of the organic amine for forming an organic amine salt include methylamine, dimethylamine, trimethylamine, ethylamine, diethylamine, triethylamine, n-propylamine, di-n-propylamine, isopropylamine, diisopropylamine, dimethylaminopropylamine, diethylaminopropylamine, dibutylaminopropylamine, iminobispropylamine, methyliminobispropylamine, 3-(dibutylamino)propylamine, n-butylamine, di-n-butylamine, tri-n-butylamine, sec-butylamine, tert-butylamine, isobutylamine, diisobutylamine, n-amylamine, isoamylamine, di-n-amylamine, tri-n-amylamine, n-hexylamine, di-n-hexylamine, trihexylamine, 2-ethylbutylamine, aminoheptane, di-n-heptylamine, octylamine, 2-aminooctane, 2-ethylhexylamine, dioctylamine, di(2-ethylhexyl)amine, trioctylamine, nonylamine, decylamine, laurylamine, octadecylamine, monoallylamine, diallylamine, triallylamine, cyclohexylamine, dicyclohexylamine, N,N-dimethyl-N-cyclohexylamine, 4,4'-diaminodicyclohexylmethane, 3,3'-dimethyl-4,4'-diaminodicyclohexylmethane, dimethylbenzylamine, ethylenediamine, N,N-diethylethylenediamine, tetramethylethylenediamine, 1,2-propanediamine, trimethylhexamethylenediamine, pentamethylenediamine, diethylenetriamine, N-(hydroxyethyl)diethylenetriamine, N-(cyanoethyl)diethylenetriamine, triethylenetetramine, tetraethylenepentamine, polyoxypropylene polyamine, isophoronediamine, monoethanolamine, diethanolamine, triethanolamine, 3-amino-1-propanol, isopropanolamine, triisopropanolamine, 2-methylaminoethanol, dimethylethanolamine, 2-ethylaminoethanol, diethylethanolamine, 2-aminoethylethanolamine, N-butyldiethanolamine, 2-dibutylaminoethanol, N-methyl-2,2'-iminodiethanol, 1,3-bis(aminomethyl)cyclohexane, and 2,4'-diphenyldiamine.

Of the above-described protonic acid salts, those which are highly soluble in a polyaniline solution and are not exceedingly acidic in the solution are preferably used in the present invention. This is because if the protonic acid salt used is acidic, the polyaniline becomes in the doped state to disadvantageously decrease its solubility. In particular, a salt of a protonic acid with a cation whose molecular size is not so large is preferably used in the present invention in view of the mechanism that will be described hereinafter.

The solution composition of the present invention can be obtained by dissolving any of the protonic acid salts described above in a solution of the imino-p-phenylene type polyaniline described above. The dissolution method is not particularly limited. Examples thereof include a method in which a protonic acid salt is dissolved directly in the polyaniline solution; a method in which a solution of a protonic acid salt is prepared separately and this solution is then mixed with the polyaniline solution; a method in which an amine is dissolved in the polyaniline solution and a protonic acid is then dissolved therein to form a protonic acid salt in the solution; and a method in which a solution of a protonic acid is prepared separately, an amine is added thereto to form a protonic acid salt, and this is then added to the polyaniline solution.

Since the protonic acid salt contained in the polyaniline solution is preferably neutral in the present invention, the polyaniline is in the undoped state. Although the protonic acid salt/polyaniline weight ratio is appropriately selected, it is usually in the range of from 0.05 to 10, preferably in the range of from 0.1 to 3.0. If the protonic acid salt/polyaniline weight ratio is too low, high electrical conductivity cannot be obtained. On the other hand, if the ratio is too high, the polyaniline film obtained may have poor strength.

According to the process of the present invention, an organic polymer solution composition obtained by dissolving the above-described organic polymer having an imino-p-phenylene structural unit as the main repeating unit in an organic solvent along with a protonic acid salt is applied on a proper substrate and dried, and the dry polymer is then subjected to oxidation and doping treatment with a solution containing dissolved or dispersed therein a protonic acid and an oxidizing agent, thereby obtaining an electrically conductive polyaniline.

According to the present invention, the solution composition containing the imino-p-phenylene type polyaniline and a protonic acid salt is applied on a suitable substrate such as a glass plate, spread with a glass rod or the like, and then dried at, e.g., 80° to 170° C., preferably 100° to 150° C., to thereby obtain a polyaniline film. The film thus obtained is a film of a polyaniline having an imino-p-phenylene structure as the main structural unit. Although the structural units of the polymer are partly converted to the quinonediiminephenylenediamine type during drying after the application of the solution composition, it is believed that 80% or more of the structural units remain unchanged from the imino-p-phenylene structure if the drying time is within 1 hour.

The polyaniline film thus obtained contains the protonic acid salt. If the protonic acid salt used is one obtained using a highly volatile amine, e.g., an ammonium salt, part of the amine vaporizes to leave a protonic acid in the polyaniline film, as described in JP-A-3-285983 mentioned hereinabove. However, it has been ascertained from the electrical conductivity that most of the amine remains as the protonic acid ammonium salt.

The polyaniline film is then subjected to oxidation and doping treatment with a solution containing a protonic acid and oxidizing agent dissolved or dispersed therein (hereinafter often referred to as a "doping liquid"). Thus, electrical conductivity can be imparted to the polyaniline. The protonic acid used in this oxidation and doping treatment is preferably one having a low $pK_a$ value and a large molecular size. This is because if a protonic acid having a small molecular size is used, this protonic acid itself is doped and doping with the protonic acid moiety of the protonic acid salt contained in the polyaniline does not occur. Specifically, preferred examples of the protonic acid include 1,5-naphthalenedisulfonic acid, m-benzenedisulfonic acid, and poly(styrenesulfonic acid). It is also preferred to use the same protonic acid as that of the protonic acid salt contained in the polyaniline.

The oxidizing agent used in the process of the present invention is preferably such that the oxidizing agent itself or a reductant after oxidation reaction is difficult to be doped with the polyaniline. It is especially preferred that the oxidizing agent be soluble or dispersible in proper solvents. Examples of such oxidizing agent include quinone type oxidizing agents such as p-benzoquinone, o-benzoquinone, p-toluquinone, oxy-p-benzoquinone, 1,2-naphthoquinone, 1,4-naphthoquinone, diphenoquinone, stilbenequinone, and 2,3-dichloro-5,6-dicyanobenzoquinone; hydroperoxide type oxidizing agents such as 2,5-dimethylhexane-2,5-dihydroxyperoxide, cumene hydroperoxide, t-butyl hydroperoxide, diisopropylbenzene hydroperoxide, p-menthane hydroperoxide, and 1,1,3,3-tetramethylbutyl hydroperoxide; hydrogen peroxide; oxime type oxidizing agents such as p-quinone dioxime; thiuram type compounds such as tetramethylthiuram monosulfide; sulfenamide type compounds such as cyclohexylbenzothiazylsulfenamide; permanganate; dichromate; iron (III) acetate; iron (III) hydroxide; and manganese dioxide.

The solvent used is not particularly limited so long as it is capable of dissolving or dispersing both the protonic acid and the oxidizing agent. Preferred examples thereof include organic polar solvents such as ethanol, N-methyl-2-pyrrolidone, N,N-dimethylformamide, N-methylformamide, formamide, N,N-dimethylacetamide, and dimethyl sulfoxide, water, and mixed solvents thereof.

In particular, a mixed solvent of water and an organic solvent is preferred from the standpoint that the solubility of the protonic acid and oxidizing agent and the speed of doping are improved. Examples of such a mixed solvent include water/ethanol, water/N-methylformamide, and water/N-methyl-2-pyrrolidone.

In preparing such a mixed solvent of water and an organic solvent, the mixing ratio of the water and the organic solvent is suitably selected according to the kinds of the protonic acid and oxidizing agent used. For example, in the case of preparing a water/ethanol solution of 1,2-ethanedisulfonic acid and p-benzoquinone, the mixed solvent preferably is one having a water content of about 20% to 90% by weight.

The concentration of the doping liquid is suitably selected according to the temperature for the doping treatment, the thickness of the polyaniline film, the desired electrical conductivity of the electrically conductive polyaniline produced, etc. However, it is generally preferred that the protonic acid concentration be in the range of from 1% to 30% by weight and the oxidizing agent concentration be in the range of from 0.5% to 20% by weight. Although the ratio of the protonic acid concentration to the oxidizing agent concentration is not particularly limited so long as doping proceeds, the preferred protonic acid/oxidizing agent ratio is usually in the range of from $1/100$ to $100/1$ by mole. In general, the higher the concentration of the doping liquid, the shorter the time required for the doping treatment.

The temperature for the doping treatment is usually from 15° to 40° C. If required and necessary, a higher temperature may be used for the doping treatment so as to shorten the necessary doping time. However, too high temperatures are not preferred in that the problem of low-boiling amine volatilization and other problems arise.

According to the process of the present invention, the polyaniline film formed from the solution composition is contacted with the above-described doping liquid to oxidize and dope the polyaniline film, thereby imparting electrical conductivity thereto. Illustratively stated, this oxidation and doping treatment of the polyaniline film is, for example, conducted by immersing the polyaniline film in the doping liquid, if required, with stirring, or coating the polyaniline film with the doping liquid, or spraying the doping liquid on the polyaniline film. It is preferable that after this oxidation and doping treatment, the resulting polyaniline film be washed with a suitable solvent such as ethanol and then dried to remove the doping liquid from the polyaniline film. This is because if the doping liquid remains in the polyaniline film, it may adversely affect the electrical conductivity or the like of the film obtained. Hence, ultrasonic cleaning is an effective cleaning technique.

The process of the present invention will be explained below with respect to its mechanism, by which the scope of the process is not limited in any way.

It is assumed that the solution composition contains, for example, an imino-p-phenylene type polyaniline and polystyrenesulfonic acid triethylamine salt as shown by

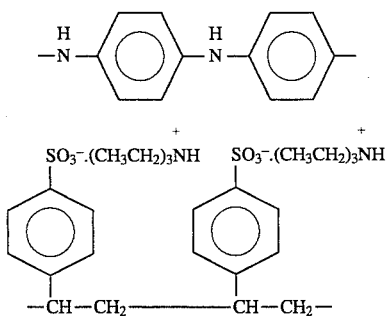

and the doping liquid contains, for example, p-benzoquinone and 1,5-naphthalenedisulfonic acid as shown below.

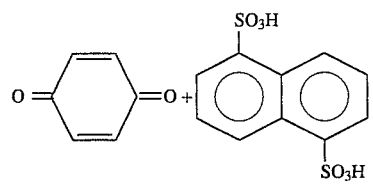

As described hereinabove, 1,5-naphthalenedisulfonic acid is one of the acids with which the polyaniline film prepared is difficult to be doped.

First, the solution composition is applied on a suitable substrate and dried to prepare an imino-p-phenylene type polyaniline containing polystyrenesulfonic acid triethylamine salt.

This polyaniline is then contacted with the doping liquid described above, upon which the imino-p-phenylene type polyaniline in the reduced state is oxidized by p-benzoquinone into a quinonediimine-phenylenediamine type polyaniline as shown below

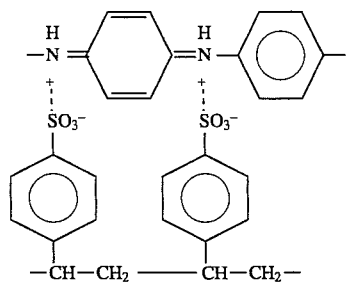

and positive charges generated on nitrogen atoms in the quinonediimine structures are neutralized by negative charges of the poly(styrenesulfonic acid) contained in the polyaniline film. Thus, the polyaniline is doped.

Along with oxidation of the polyaniline of from the imino-p-phenylene type to the quinonediimine-phenylenediamine type, the p-benzoquinone in the doping liquid turns into a dianionic structure and is then reduced to p-hydroquinone by proton donation by the 1,5-naphthalenedisulfonic acid as shown below

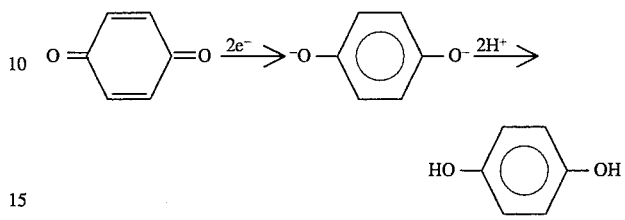

As a result, the 1,5-naphthalenedisulfonic acid changes into a dianion, while the triethylammonium (cation) in the polyaniline film diffuses in the film and combines with the dianion of 1,5-naphthalenedisulfonic acid to form 1,5-naphthalenedisulfonic acid triethylamine salt, as shown below.

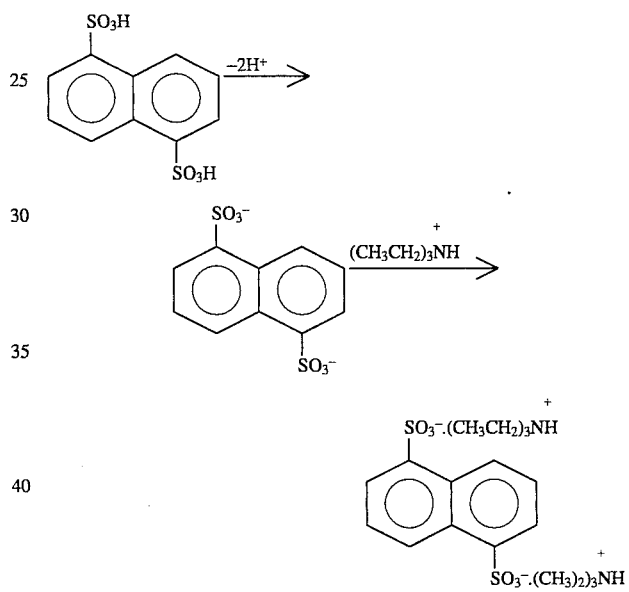

Thus, according to the process of the present invention, the imino-p-phenylene type polyaniline is oxidized into a quinonediimine-phenylenediamine type polyaniline and, at the same time, is doped with poly(styrenesulfonic acid). That is, in the process of the present invention, not the 1,5-naphthalenedisulfonic acid but the triethylammonium diffuses in the film during the doping treatment of the polyaniline.

As described above, the solution composition of the present invention obtained by dissolving an organic polymer having the above-described imino-p-phenylene structural unit as the main repeating unit and a protonic acid salt in an organic solvent has excellent solution stability. Further, electrical conductivity can be speedily imparted to the polyaniline by applying the solution composition on a substrate, drying the applied composition, and then subjecting the dry film to the oxidation and doping treatment with a solution containing dissolved or dispersed therein both a protonic acid and an oxidizing agent. Thus, according to the process of the present invention, since the dopant is present in the polyaniline film, the doping treatment of the polyaniline can be accomplished within a short period of time by treatment with an oxidizing agent.

Furthermore, according to the process of the present invention, an electrically conductive polyaniline having excellent stability can be obtained by selecting a protonic acid.

The present invention is further described in more detail by reference to the following Reference Example and Examples, but the invention is not construed as being limited thereto in any way. All parts, percents, ratios and the like are by weight unless otherwise indicated.

REFERENCE EXAMPLE 1

Production of quinonediimine-phenylenediamine type electrically conductive polyaniline in the doped state by oxidative polymerization of aniline Into a 10 liter separable flask equipped with a stirrer, thermometer, and straight-tube adapter were introduced 6,000 g of distilled water, 360 ml of 36% hydrochloric acid, and 400 g (4.295 mol) of aniline in this order, and aniline was dissolved.

On the other hand, 434 g (4.295 mol) of 97% concentrated sulfuric acid was added to and mixed with 1,493 g of distilled water in a beaker with cooling with ice water to prepare an aqueous sulfuric acid solution. This aqueous sulfuric acid solution was added to the above-obtained solution in the separable flask and the whole flask was then cooled to −4° C. in a thermostatic low-temperature bath.

Further, 980 g (4.295 mol) of ammonium peroxodisulfate was added to 2,293 g of distilled water in a beaker and dissolved therein to prepare an aqueous oxidizing agent solution.

The above-prepared aqueous solution of ammonium peroxodisulfate was gradually added dropwise to the acidic aqueous aniline salt solution through the straight-tube adapter using a tubing pump at a rate of 1 ml/min or less with stirring, while the whole flask was continued to cool in the thermostatic low-temperature bath so that the temperature of the reaction mixture was maintained at −3° C. or lower. As the polymerization proceeded, the solution which was colorless and transparent in the beginning turned greenish blue and then blackish green and, thereafter, a blackish green powder was deposited.

Although the temperature of the reaction mixture rises upon the powder deposition, it is important to always maintain the temperature of the reaction system at 0° C. or lower, preferably −3° C. or lower, in order to obtain a high molecular weight polymer. After the powder deposition, the dropwise addition of the aqueous ammonium peroxodisulfate solution may be conducted at a slightly increased rate of, for example, about 8 ml/min. In this case also, the addition rate should be regulated so as to maintain the temperature of the reaction mixture at −3° C. or lower, while monitoring the temperature. The dropwise addition of the aqueous ammonium peroxodisulfate solution was thus conducted and completed, which took 7 hours. The stirring of the resulting reaction mixture was further continued thereafter for additional 1 hour at a temperature of −3° C. or lower.

The polymer powder obtained was collected by filtration, washed with water and with acetone, and then dried in vacuo at room temperature, thereby obtaining 430 g of a blackish green powder of a quinonediimine-phenylenediamine type electrically conductive polyaniline.

The thus-obtained powder was press-molded into a disk having a diameter of 13 mm and a thickness of 700 μm, and its electrical conductivity was measured by the van der Pauw's method and found to be 14 S/cm.

Production of solvent-soluble quinonediimine-phenylenediamine type polyaniline by undoping of the electrically conductive organic polymer To 4 liters of 2 N aqueous ammonia was added 350 g of the above-obtained doped electrically conductive polyaniline powder. This mixture was stirred with an automatic homomixer at 5,000 rpm for 5 hours. As a result, the color of the mixture changed from blackish green to bluish purple.

The resulting powder was collected by filtration with a Buchner funnel, and was repeatedly washed in a beaker with distilled water with stirring until the filtrate became neutral. The powder was then further washed with acetone until the filtrate became colorless. Thereafter, the powder was dried in vacuo at room temperature for 10 hours, thereby obtaining 280 g of a blackish brownpowder of undoped, solvent-soluble quinonediimine-phenylenediamine type polyaniline.

This polyaniline was soluble in N-methyl-2-pyrrolidone and the solubility thereof in this solvent was 8 g in 100 g solvent (7.4%). The intrinsic viscosity [η] of the polyaniline as measured in that solvent at 30° C. was 1.23 dl/g.

EXAMPLE 1

In 90 g of N-methyl-2-pyrrolidone was dissolved 1.49 g of phenylhydrazine. In this solution was then dissolved, with stirring, 10 g of the solvent-soluble quinonediiminephenylenediamine type polyaniline obtained in Reference Example 1. Upon this dissolution, the color of the solution was changed from dark blue to light blackish brown and, at the same time, generation of nitrogen gas was observed. It was ascertained from those facts that the polyaniline had been converted from the quinonediimine-phenylenediamine type to the imino-p-phenylene type. This solution was filtered with a G2 filter under reduced pressure.

In 58.92 g of N-methyl-2-pyrrolidone were dissolved 5 g of 1,5-naphthalenedisulfonic acid tetrahydrate and 2.92 g of diethanolamine. 3.33 g of the thus-obtained 1,5-naphthalenedisulfonic acid solution was mixed with 5 g of the polyaniline solution prepared above, and this mixture was degassed. The resulting mixture was cast on a glass plate and heat-dried at 150° C. for 30 minutes to obtain an imino-p-phenylene type polyaniline film having a thickness of 22 to 27 μm.

On the other hand, a 5% by weight ethanol solution of p-benzoquinone and a 20% aqueous solution of 1,5-naphthalenedisulfonic acid tetrahydrate were prepared. Those solutions were mixed together in a weight ratio of 1:1 to prepare a doping liquid.

The film obtained above was cut into a size of 1.5 cm by 1.5 cm, immersed in the above-prepared doping liquid at room temperature for various times, washed with ethanol, and then dried at 60° C. for 20 minutes. Thus, electrically conductive polyaniline films were obtained. The immersion times and the electrical conductivities of the films are shown in Table 1.

The solution composition containing both the imino-p-phenylene type polyaniline and 1,5-naphthalenedisulfonic acid diethanolamine salt was able to be stored stably over one month or more in a closed argon atmosphere at a temperature of −25° C.

COMPARATIVE EXAMPLE 1

The 10% polyaniline solution obtained in Example 1 was degassed, cast on a glass plate, and then dried at 150° C. for 30 minutes, thereby obtaining an imino-p-phenylene type polyaniline film having a thickness of 22 μm.

This film was cut into a size of 1.5 cm by 1.5 cm, immersed in the same doping liquid as that in Example 1 at room temperature for various times, washed with ethanol, and then dried at 60° C. for 20 minutes. Thus, electrically conductive polyaniline films were obtained. The immersion times and the electrical conductivities of the films are shown in Table 1.

TABLE 1

| Treatment time | Electrical conductivity (S/cm) | |
| --- | --- | --- |
| (min) | Example 1 | Comparative Example 1 |
| 0 | $2.3 \times 10^{-5}$ | $10^{-8}$ or less |
| 10 | 3.8 | $5.6 \times 10^{-4}$ |
| 20 | 3.8 | $1.1 \times 10^{-3}$ |
| 30 | 4.9 | $1.3 \times 10^{-3}$ |
| 60 | 4.2 | $1.7 \times 10^{-3}$ |
| 120 | 4.2 | $3.0 \times 10^{-3}$ |

COMPARATIVE EXAMPLE 2

In 61.82 g of N-methyl-2-pyrrolidone was dissolved 5 g of 1,5-naphthalenedisulfonic acid tetrahydrate. 3.3 g of this solution was mixed with 5 g of the 10% polyaniline solution obtained in Example 1. This mixture was degassed, cast on a glass plate, and then heat-dried at 150° C. for 30 minutes, thereby obtaining a polyaniline film having a thickness of 25 μm.

This film was cut into a size of 1.5 cm by 1.5 cm, and the electrical conductivity thereof was measured and found to be $10^{-3}$ S/cm. This film was allowed to stand in the air for 1 week, upon which the electrical conductivity was changed to 1 S/cm.

The above-prepared solution of polyaniline and 1,5-naphthalenedisulfonic acid was stored in a closed argon atmosphere at a temperature of −25° C. As a result, precipitates were formed in one month and the solution became unsuitable for use in film formation.

EXAMPLE 2

In 4.21 g of N-methyl-2-pyrrolidone were dissolved 0.51 g of polystyrenesulfonic acid and 0.28 g of triethylamine. This solution was mixed with 5 g of the 10% polyaniline solution obtained in Example 1 and the resulting mixture was degassed.

The mixture prepared above was cast on a glass plate and heat-dried at 150° C. for 30 minutes, thereby obtaining an imino-p-phenylene type polyaniline film having a thickness of 20 μm.

This film was cut into a size of 1.5 cm by 1.5 cm, immersed in the same doping liquid as that in Example 1 at room temperature for 20 minutes, washed with ethanol, and then dried at 60° C. for 20 minutes. Thus, an electrically conductive polyaniline film was obtained. The electrical conductivity of this film was 0.4 S/cm.

EXAMPLE 3

In 4.33 g of N-methyl-2-pyrrolidone was dissolved 0.67 g of a sodium salt of β-naphthalenesulfonic acid-formalin condensate (DEMOL N, manufactured by Kao Corp., Japan). This solution was mixed with 5 g of the 10% polyaniline solution obtained in Example 1 and the resulting mixture was degassed.

The mixture prepared above was cast on a glass plate and heat-dried at 120° C. for 20 minutes, thereby obtaining an imino-p-phenylene type polyaniline film having a thickness of 40 μm.

This film was cut into a size of 1.5 cm by 1.5 cm, immersed in the same doping liquid as that in Example 1 at room temperature for 10 minutes, washed with ethanol, and then dried at 60° C. for 20 minutes. Thus, an electrically conductive polyaniline film was obtained. The electrical conductivity of this electrically conductive polyaniline film was 1.7 S/cm.

EXAMPLE 4

In 3.68 g of N-methyl-2-pyrrolidone were dissolved 0.76 g of polystyrenesulfonic acid and 0.42 g of triethylamine. 4.86 g of this solution was mixed with 5.0 g of the 10% polyaniline solution obtained in Example 1 and the resulting mixture was degassed.

The mixture prepared above was cast on a glass plate and heat-dried at 150° C. for 30 minutes, thereby obtaining an imino-p-phenylene type polyaniline film having a thickness of 36 μm.

This film was cut into a size of 1.5 cm by 1.5 cm, immersed in the same doping liquid as that in Example 1 at 40° C. for 20 minutes, washed with ethanol, and then dried at 60° C. for 20 minutes. Thus, an electrically conductive polyaniline film was obtained. The electrical conductivity of this film was 1.0 S/cm.

EXAMPLE 5

In 25.37 g of N-methyl-2-pyrrolidone were dissolved 5.1 g of polystyrenesulfonic acid and 2.91 g of diethanolamine. 1.0 g of this solution was mixed with 5.0 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 27 μm.

This film was cut into a size of 1.5 cm by 1.5 cm, immersed in the same doping liquid as that in Example 1 at room temperature for 120 minutes, washed with ethanol, and then dried at 60° C. for 20 minutes. Thus, an electrically conductive polyaniline film was obtained. The electrical conductivity of this film was 1.0 S/cm.

EXAMPLE 6

In 8.52 g of N-methyl-2-pyrrolidone were dissolved 1.48 g of polyvinylsulfonic acid and 2.54 g of tributylamine. 2.5 g of this solution was mixed with 5.0 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 25 μm.

This film was cut into a size of 1.5 cm by 1.5 cm, immersed in the same doping liquid as that in Example 1 at room temperature for 20 minutes, washed with ethanol, and then dried at 60° C. for 20 minutes. Thus, an electrically conductive polyaniline film was obtained. The electrical conductivity of this film was 16.7 S/cm.

EXAMPLE 7

In 21.46 g of N-methyl-2-pyrrolidone was dissolved 6.05 g of a sodium salt of sulfonated polyethersulfone. 5.0 g of this solution was mixed with 4.0 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 35 μm.

This film was cut into a size of 1.5 cm by 1.5 cm, immersed in the same doping liquid as that in Example 1 at room temperature for 120 minutes, washed with ethanol, and then dried at 60° C. for 20 minutes. Thus, an electrically conductive polyaniline film was obtained. The electrical conductivity of this film was 0.018 S/cm.

EXAMPLE 8

In 4.00 g of N-methyl-2-pyrrolidone were dissolved 1.00 g of polyisoprenesulfonic acid and 1.04 g of triethanolamine. 2.41 g of this solution was mixed with 5.0 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 40 μm.

This film was cut into a size of 1.5 cm by 1.5 cm, immersed in the same doping liquid as that in Example 1 at room temperature for 120 minutes, washed with ethanol, and then dried at 60° C. for 20 minutes. Thus, an electrically conductive polyaniline film was obtained. The electrical conductivity of this film was 5.3 S/cm.

EXAMPLE 9

In 5.53 g of dimethyl sulfoxide was dissolved 0.62 g of a sodium salt of N-sulfopropylpolyaniline. 5.0 g of this solution was mixed with 5.0 g of the 10% polyaniline solution obtained in Example 1 and the resulting mixture was degassed.

The mixture prepared above was cast on a glass plate and heat-dried at 130° C. for 30 minutes, thereby obtaining an imino-p-phenylene type polyaniline film having a thickness of 20 μm.

This film was cut into a size of 1.5 cm by 1.5 cm, immersed in the same doping liquid as that in Example 1 at room temperature for 120 minutes, washed with ethanol, and then dried at 60° C. for 20 minutes. Thus, an electrically conductive polyaniline film was obtained. The electrical conductivity of this film was 8.3 S/cm.

EXAMPLE 10

In 36.29 g of N-methyl-2-pyrrolidone were dissolved 1.57 g of 1,2-ethanedisulfonic acid and 2.14 g of dibutylamine. 40 g of this solution was mixed with 60 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 38 μm.

This film was cut into a size of 1 cm by 1 cm, immersed in the same doping liquid as that in Example 1 at room temperature for 120 minutes, washed with ethanol, and then dried at 60° C. for 10 minutes. Thus, an electrically conductive polyaniline film was obtained. The electrical conductivity of this film was 10.2 S/cm.

EXAMPLE 11

In 4.5 g of N-methyl-2-pyrrolidone were dissolved 0.5 g of an alkylnaphthalenesulfonic acid (PELEX NBL, manufactured by Kao Corp.) and 0.183 g of triethylamine. 4.15 g of this solution was mixed with 5.0 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 25 μm.

This film was cut into a size of 1.5 cm by 1.5 cm, immersed in the same doping liquid as that in Example 1 at room temperature for 120 minutes, washed with ethanol, and then dried at 60° C. for 20 minutes. Thus, an electrically conductive polyaniline film was obtained. The electrical conductivity of this film was 1.5 S/cm.

EXAMPLE 12

In 30.29 g of N-methyl-2-pyrrolidone were dissolved 3.58 g of polyvinylsulfonic acid and 6.13 g of tributylamine. 40 g of this solution was mixed with 60 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 39 μm.

On the other hand, a 5% ethanol solution of p-quinone and a 20% aqueous solution of poly(vinylsulfonic acid) were mixed in a weight ratio of 1:1 to prepare a doping liquid.

The film obtained above was cut into a size of 1 cm by 1 cm, immersed in the above doping liquid at room temperature for 60 minutes, washed with ethanol, and then dried at 60° C. for 10 minutes. Thus, an electrically conductive polyaniline film was obtained. The electrical conductivity of this film was 8.6 S/cm.

EXAMPLE 13

In 30.29 g of N-methyl-2-pyrrolidone were dissolved 3.58 g of polyvinylsulfonic acid and 6.13 g of tributylamine. 40 g of this solution was mixed with 60 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 30 μm.

On the other hand, a 5% ethanol solution of p-quinone dioxime and a 40% aqueous solution of 1,5-naphthalenedisulfonic acid were mixed in a weight ratio of 1:1 to prepare a doping liquid.

The film obtained above was cut into a size of 1.5 cm by 1.5 cm, immersed in the above doping liquid at room temperature for 30 minutes, washed with ethanol, and then dried at 60° C. for 10 minutes. Thus, an electrically conductive polyaniline film was obtained. The electrical conductivity of this film was 3.8 S/cm.

EXAMPLE 14

In 30.29 g of N-methyl-2-pyrrolidone were dissolved 3.58 g of polyvinylsulfonic acid and 6.13 g of tributylamine. 40 g of this solution was mixed with 60 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 30 μm.

On the other hand, a 5% ethanol solution of 2,3-dichloro-5,6-dicyanobenzoquinone and a 40% aqueous solution of 1,5-naphthalenedisulfonic acid were mixed in a weight ratio of 1:1 to prepare a doping liquid.

The film obtained above was cut into a size of 1.5 cm by 1.5 cm, immersed in the above doping liquid at room temperature for 30 minutes, washed with ethanol, and then dried at 60° C. for 10 minutes. Thus, an electrically conductive polyaniline film was obtained. The electrical conductivity of this film was 4.4 S/cm.

EXAMPLE 15

In 30.29 g of N-methyl-2-pyrrolidone were dissolved 3.58 g of polyvinylsulfonic acid and 6.13 g of tributylamine. 40 g of this solution was mixed with 60 g of the 10% polyaniline solution obtained in Example 1 and the resulting mixture was degassed.

The mixture prepared above was cast on a glass plate and heat-dried at 120° C. for 30 minutes, thereby obtaining an imino-p-phenylene type polyaniline film having a thickness of 45 μm.

On the other hand, 1 g of iron (III) acetate was dispersed in 100 g of a 20% aqueous solution of 1,5-naphthalenedisulfonic acid under stirring to prepare a doping liquid.

The film obtained above was cut into a size of 1 cm by 1 cm, immersed in the above doping liquid at room temperature for 10 minutes, washed with ethanol, and then dried at 60° C. for 10 minutes. Thus, an electrically conductive polyamiline film was obtained. The electrical conductive of this film was 0.68 S/cm.

While the invention has been described in detail and with reference to specific embodiments thereof, it will be apparent to one skilled in the art that various changes and modifications can be made therein without departing from the spirit and scope thereof.

What is claimed is:

1. A process for producing an electrically conductive organic polymer, which comprises the steps of:

applying on a substrate an organic polymer solution composition comprising an organic polymer having an imino-p-phenylene structural unit represented by formula (I):

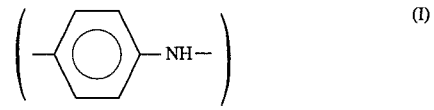

as the main repeating unit, a protonic acid salt, and an organic solvent, wherein said organic polymer and said protonic acid salt are dissolved in Said organic solvent, drying the applied composition, and then subjecting the dry polymer to an oxidation and doping treatment with a solution containing dissolved or dispersed therein both a protonic acid and an oxidizing agent, wherein the protonic acid is at least one protonic acid selected from the group consisting of 1,5-naphthalenedisulfonic acid, m-benzenedisulfonic acid, and poly(styrenesulfonic acid), wherein the protonic acid in the protonic acid salt is the same as or different from the protonic acid in the oxidation and doping treatment, and wherein the oxidizing agent is at least one oxidizing agent selected from the group consisting of a quinone oxidizing agent, a hydroperoxide oxidizing agent, hydrogen peroxide, an oxime oxidizing agent, a thiuram oxidizing agent, a sulfenamide oxidizing agent, a permanganate, a dichromate, iron (III) acetate, iron (III) hydroxide, and manganese dioxide.

2. A process as claimed in claim 1, wherein the organic polymer is soluble in an organic solvent in the undoped state and has an intrinsic viscosity [η] as measured in N-methyl-2-pyrrolidone at 30° C. of 0.40 dl/g or higher.

3. A process as claimed in claim 1, wherein the protonic acid salt is a salt of a protonic acid having a p$K_a$ value of 4.8 or less.

4. A process as claimed in claim 1, wherein the protonic acid salt is a salt of a polyvalent aromatic sulfonic acid.

5. A process as claimed in claim 1, wherein the protonic acid salt is a salt of a polymer acid.

6. A process as claimed in claim 1, wherein the protonic acid salt is an ammonium salt or organic amine salt of a protonic acid.

7. A process as claimed in claim 1, wherein the protonic acid salt is a metal salt of a protonic acid.

* * * * *